(12) United States Patent
Bhat et al.

(10) Patent No.: US 11,054,383 B2
(45) Date of Patent: Jul. 6, 2021

(54) CHIP-SCALE SENSING DEVICE FOR LOW DENSITY MATERIAL

(71) Applicant: InSyte Systems, Inc., Newark, CA (US)

(72) Inventors: Jerome Chandra Bhat, Palo Alto, CA (US); Jim Chih-Min Cheng, Fremont, CA (US); Richard Ian Olsen, Truckee, CA (US)

(73) Assignee: InSyte Systems, Inc., Newark, CA (US)

( * ) Notice: Subject to any disclaimer, the term of this patent is extended or adjusted under 35 U.S.C. 154(b) by 151 days.

(21) Appl. No.: 16/254,241

(22) Filed: Jan. 22, 2019

(65) Prior Publication Data

US 2019/0227024 A1 Jul. 25, 2019

Related U.S. Application Data

(60) Provisional application No. 62/620,963, filed on Jan. 23, 2018, provisional application No. 62/620,372, filed on Jan. 22, 2018.

(51) Int. Cl.
*G01N 27/407* (2006.01)
*G01N 27/404* (2006.01)
(Continued)

(52) U.S. Cl.
CPC ....... *G01N 27/4078* (2013.01); *G01N 27/304* (2013.01); *G01N 27/404* (2013.01); *G01N 27/407* (2013.01); *G01N 27/4166* (2013.01)

(58) Field of Classification Search
None
See application file for complete search history.

(56) References Cited

U.S. PATENT DOCUMENTS

| 4,049,503 A | 9/1977 | Becker et al. |
| 4,051,006 A | 9/1977 | Neti et al. |

(Continued)

FOREIGN PATENT DOCUMENTS

| GB | 2326481 A * 12/1998 | ........... G01N 27/404 |
| WO | 2005015195 A1 2/2005 | |

(Continued)

OTHER PUBLICATIONS

International Searching Authority, International Search Report, PCT Application No. PCT/US19/14573, dated Apr. 10, 2019.
International Searching Authority, International Search Report, PCT Application No. PCT/US19/14585, dated Apr. 19, 2019.
J.R. Stetter et al., "Amperometric Gas Sensors—A Review", Chemical Reviews, Jan. 18, 2008, pp. 352-366, vol. 108, No. 2., American Chemical Society, Washington, DC, USA.

(Continued)

*Primary Examiner* — J. Christopher Ball
(74) *Attorney, Agent, or Firm* — Intrinsic Law Corp.

(57) ABSTRACT

An electrochemical sensor device that is efficiently and economically produced at the chip level for a variety of applications is disclosed. In some aspects, the device is made on or using a wafer technology whereby a sensor chamber is created by said wafer and a gas port allows for a working electrode of the sensor to detect certain gases. Large scale production is possible using wafer technology where individual sensors are produced from one or more common wafers. Integrated circuits are made in or on the wafers in an integrated way so that the wafers provide the substrate for the integrated circuitry and interconnects as well as providing the definition of the chambers in which the gas sensors are disposed.

17 Claims, 8 Drawing Sheets

(51) Int. Cl.
*G01N 27/30* (2006.01)
*G01N 27/416* (2006.01)

(56) References Cited

U.S. PATENT DOCUMENTS

| | | | |
|---|---|---|---|
| 4,227,984 | A | 10/1980 | Dempsey et al. |
| 4,668,374 | A | 5/1987 | Bhagat et al. |
| 4,820,386 | A | 4/1989 | LaConti et al. |
| 5,116,650 | A * | 5/1992 | Bowser .............. B01D 39/1623 162/168.1 |
| 5,624,546 | A | 4/1997 | Milco |
| 6,284,545 | B1 | 9/2001 | Warburton et al. |
| 7,491,547 | B1 | 2/2009 | Warburton |
| 7,771,654 | B1 * | 8/2010 | Moore ................ G01N 33/0031 422/62 |
| 9,983,164 | B1 | 5/2018 | Allen et al. |
| 9,989,492 | B1 | 6/2018 | Cheng et al. |
| 10,132,699 | B1 | 11/2018 | Pillars et al. |
| 10,139,382 | B2 | 11/2018 | Motayed et al. |
| 2007/0017193 | A1 * | 1/2007 | Nishio ................ B01D 39/1692 55/492 |
| 2014/0311905 | A1 | 10/2014 | Stetter et al. |
| 2014/0355381 | A1 | 12/2014 | Lal et al. |
| 2015/0241375 | A1 | 8/2015 | Merz et al. |
| 2015/0346138 | A1 | 12/2015 | Allen et al. |
| 2017/0131230 | A1 | 5/2017 | Papageorge et al. |
| 2017/0336343 | A1 | 11/2017 | Bhat et al. |
| 2019/0041371 | A1 | 2/2019 | Dinsmore |

FOREIGN PATENT DOCUMENTS

| | | |
|---|---|---|
| WO | 2016029003 A1 | 2/2016 |
| WO | WO2017201477 A1 | 11/2017 |

OTHER PUBLICATIONS

SPEC Sensors, "SPEC Sensor Operation and Performance Considerations", SPEC Sensor Operation Overview, May 2016, pp. 1-6, SPEC Sensors, LLC.
ISA, "International Search Report", PCT/US2017/033649, dated Oct. 2, 2017.
M. T. Carter et al., "Printed Amperometric Gas Sensors", ECS Transcactions, 2012, pp. 211-220, vol. 50, No. 12., The Electrochemical Society.
P. Kubersky et al., "Amperometric NO2 Sensor Based on Solid Polymer Electrolyte for Screen Printing Technology", The 14th International Meeting on Chemical Sensors, 2012, pp. 1680-1683, Association for Sensors Measurement.
P. Kubersky et al., "An Electrochemical NO2 Sensor Based on Ionic Liquid: Influence of the Morphology of the Polymer Electrolyte on Sensor Sensitivity", Sensors, 2015, pp. 28422-28434, MDPI AG.
Barzana et al., "Enzyme-Catalyzed, Gas-Phase Reactions", Applied Biochemistry and Biotechnology, 1987, pp. 25-34, vol. 15, The Humana Press Inc.
Parvaresh et al., "Gas Phase Transesterification Reactions Catalyzed by Lipolytic Enzymes", Biotechnology and Bioengineering, 1992, pp. 467-473, vol. 39, John Wiley & Sons, Inc.
M. T. Carter et al., "Amperometric Gas Sensors with Ionic Liquid Electrolytes", 224th ECS Meeting, 2013, Abstract #2617, The Electrochemical Society.
G. J. Maclay et al., "Microfabricated Amperometric Gas Sensors", IEEE Transactions on Electron Devices, Jul. 1988, pp. 793-799, vol. 35, No. 6, IEEE.
J. R. Stetter et al., "Sensors, Chemical Sensors, Electrochemical Sensors, and ECS", Journal of the Electrochemical Society, 2003, pp. S11-S16, vol. 150, No. 2, The Electrochemical Society, Inc.

* cited by examiner

CHIP-SCALE SENSING DEVICE FOR LOW DENSITY MATERIAL

RELATED APPLICATIONS

This application claims the benefit of and priority to U.S. Provisional Application No. 62/620,372 titled "Chip-Scale Sensing Device for Low Density Material", filed on Jan. 22, 2018, as well as Provisional Application Ser. No. 62/620,963, entitled "Low Impedance Sensor for Low Density Material", filed on Jan. 23, 2018, both of which are hereby incorporated by reference.

TECHNICAL FIELD

This invention relates to the design and manufacture of sensor devices that sense or identify low density materials, e.g., gasses by an electrochemical cell integrated with a sensing circuit in a chip-scale package.

BACKGROUND

Given the changes in the earth's atmosphere, precipitated by industrialization and natural sources, as well as the dramatically increasing number of household and urban pollution sources, the need for accurate and continuous air quality monitoring has become necessary to both identify the sources and warn consumers of impending danger. Tantamount to making real-time monitoring and exposure assessment a reality is the ability to deliver, low cost, small form factor, and low power devices which can be integrated into the broadest range of platforms and applications.

There are multiple methods of sensing distinct low-density materials such as gasses. Common methods include nondispersive infrared spectroscopy (NDIR), the use of metal oxide sensors, the use chemiresistors, and the use of electrochemical sensors. The present invention pertains to electrochemical sensors.

One drawback with a conventional electrochemical sensor is that its size (e.g., volume of electrolyte and size of electrodes) is relatively large so that it takes a long time to stabilize when subjected to the target gas. Further, since the change in current in response to a gas is small, there is a low signal to noise ratio, and there are losses and RF coupling due to metal traces leading to processing circuitry external to the sensor, further reducing the signal to noise ratio. Additionally, the electrochemical cell body is typically a polymer that cannot withstand temperatures above 150° C., and the electrolyte comprises an aqueous acid that cannot withstand temperatures above approximately 100° C. This prevents the electrical contacts from being soldered to a printed circuit board by reflowing the solder (typically at 180-260° C.) and prevents the used of some heat-cured conductive adhesives such as silver-containing epoxies, or anisotropic conductive films or pastes (typically at cured at 120-150° C.).

There are multiple methods of sensing distinct low-density materials such as gasses. Common methods include nondispersive infrared spectroscopy (NDIR), the use of metal oxide sensors, the use chemiresistors, and the use of electrochemical sensors. Some electrochemical sensors are also known to those skilled in the art. In this application, we describe the further miniaturization of such an integrated electrochemical system via the application of wafer-level packaging, panel-level packaging, and chip-scale packaging techniques.

This disclosure provides a number of designs, features, novel devices and methods for making and using the same.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

One or more embodiments are directed to a chip-level electrochemical sensing device, comprising a base wafer having an externally facing side and an internally facing side, said internally facing side partially defining a sensor chamber, said base wafer further having a plurality of through vias penetrating said base wafer and extending between the internally and externally facing sides thereof; at first one of said through vias comprising a gas port that allows gas communication between said externally and internally facing sides of the base wafer, and specifically allowing a gas on the externally facing side of the base wafer to pass through said gas port through via into said sensor chamber; an electrochemical sensor responsive to a property of said gas, disposed in said sensor chamber; the electrochemical sensor comprising a first electrode and a second electrode, wherein the first and second electrodes coupled by an electrolyte, and wherein the first electrode is exposed to said gas entering the sensor chamber through said gas port; a second one of said through vias comprising a conducting through via electrically coupling said first electrode of the electrochemical sensor to a first electrical contact on the externally facing side of said base wafer; a third one of said vias comprising a conducting through via electrically coupling said second electrode of the electrochemical sensor to a second electrical contact on the externally facing side of said base wafer; and at least one set of electrical connections that carry electrical signals to and from said device; and an integrated circuit constructed on or in any of the base wafer and cap wafer, said integrated circuit electrically coupled to said set of electrical connections.

Other embodiments are directed to an article of manufacture, comprising a common base wafer and a common cap wafer, into which a plurality of integrated circuits are packaged, and onto which a plurality of electrochemical sensor devices are created; each of said plurality of sensor devices comprising a plurality of electrodes disposed within respective sensor chambers at least partially defined by the base wafer and the cap wafer and sidewalls separating said cap wafer and base wafer; each of said plurality of sensor devices further comprising an electrolyte material contacting each of said sensor device's respective plurality of sensor electrodes; and wherein at least one sensor electrode of each sensor device comprises a working electrode in gas communication with an external environment of said device by way of a respective gas port through via in one of said base and cap wafers so as to provide gas coupling between the working electrode and the external environment, while being gas-isolated from other electrodes within the same sensor device.

Yet other embodiments are directed to a method for making a chip-level electrochemical sensor device, comprising forming a plurality of wafers including a base wafer and cap wafer, each of the cap and base wafers having an internally-facing side and an externally facing side; forming through vias in one or more of said cap and base wafers, including at least one gas port through via allowing movement of a gas from an exterior of said device to an interior space therein; forming a plurality of electrochemical sensor electrodes, including a working electrode, in a sensor chamber defined by said cap and base wafers, said working electrode being disposed in a portion of the sensor chamber in gas communication with the exterior of the device by way of said gas port through via; placing an electrolyte in contact with each of said plurality of sensor electrodes within the sensor chamber; isolating a volume within said sensor chamber comprising said working electrode to prevent or reduce a movement of gas between said portion of the sensor chamber containing the working electrode and other portions of the sensor chamber; and forming electrical connections in said cap and base wafers so as to electrically connect the plurality of electrodes to one another or to external connections points.

Still other embodiments are directed to a chip-scale gas sensor, comprising a cap wafer; a base wafer; a spacer wafer disposed between the cap and base wafers and together with the cap and base wafers defining a sensor chamber; a solid or semi-solid electrolyte within said sensor chamber; a plurality of sensor electrodes within said sensor chamber, each of said sensor electrodes in contact with the solid or semi-solid electrolyte; a gas port through via in any of said cap and base wafers; a gas blocking gasket coupled to said electrolyte; and an application specific integrated circuit (ASIC) integrated into either of said cap or base wafers. The gas port through via may have a gas filter applied thereto which filters, blocks or otherwise affects a gas moving through the gas port.

Therefore, in various aspects, an electrochemical sensor device that is efficiently and economically produced at the chip level for a variety of applications is disclosed. In some aspects, the device is made on or using a wafer technology whereby a sensor chamber is created by said wafer and a gas port allows for a working electrode of the sensor to detect certain gases. Large scale production is possible using wafer technology where individual sensors are produced from one or more common wafers. Integrated circuits are made in or on the wafers in an integrated way so that the wafers provide the substrate for the integrated circuitry and interconnects as well as providing the definition of the chambers in which the gas sensors are disposed.

BRIEF DESCRIPTION OF THE DRAWINGS

For a fuller understanding of the nature and advantages of the present technology, reference is made to the following detailed description of preferred embodiments and in connection with the accompanying drawings, in which.

DETAILED DESCRIPTION

In an electrochemical sensor, a sensor electrode (also known as a working electrode) contacts a suitable electrolyte. The sensor electrode typically comprises a catalytic metal that reacts with the target gas and electrolyte to release or accept electrons, which creates a characteristic current in the electrolyte when the electrode is properly biased and when used in conjunction with an appropriate counter-electrode. The current is generally proportional to the amount of target gas contacting the sensor electrode. By using a sensor electrode material and bias that is targeted to the particular gas to be detected and sensing the current, the concentration of the target gas in the ambient atmosphere can be determined.

One or more embodiments of the present invention are directed to an electrochemical sensing device, which is preferably a chip-level device and manufactured on a semiconductor-based architecture such as using a silicon-based wafer like those used in by the integrated circuit industry. However, ceramic or other substrates can also be employed as a base wafer in the present designs. The present device is therefore compact in size, easy and inexpensive to manufacture in large numbers, and can have wide applications beyond prior sensor designs. In an aspect, the present sensor devices can be used to detect certain gases in an atmosphere or environment of the sensor devices. Many configurations can be designed based on the current disclosure. The present disclosure can utilize a number of different electrochemical sensors, which may include examples described in Publication 2017/0336434, incorporated herein by reference, directed to integration of an electrochemical cell with an electronic circuit in a small form-factor package. Some specific preferred embodiments are presented below, but those skilled in the art will appreciate how to extend this disclosure, using a variety of materials, dimensions and arrangements that are all comprehended by this disclosure and its appended claims.

Figure 1:
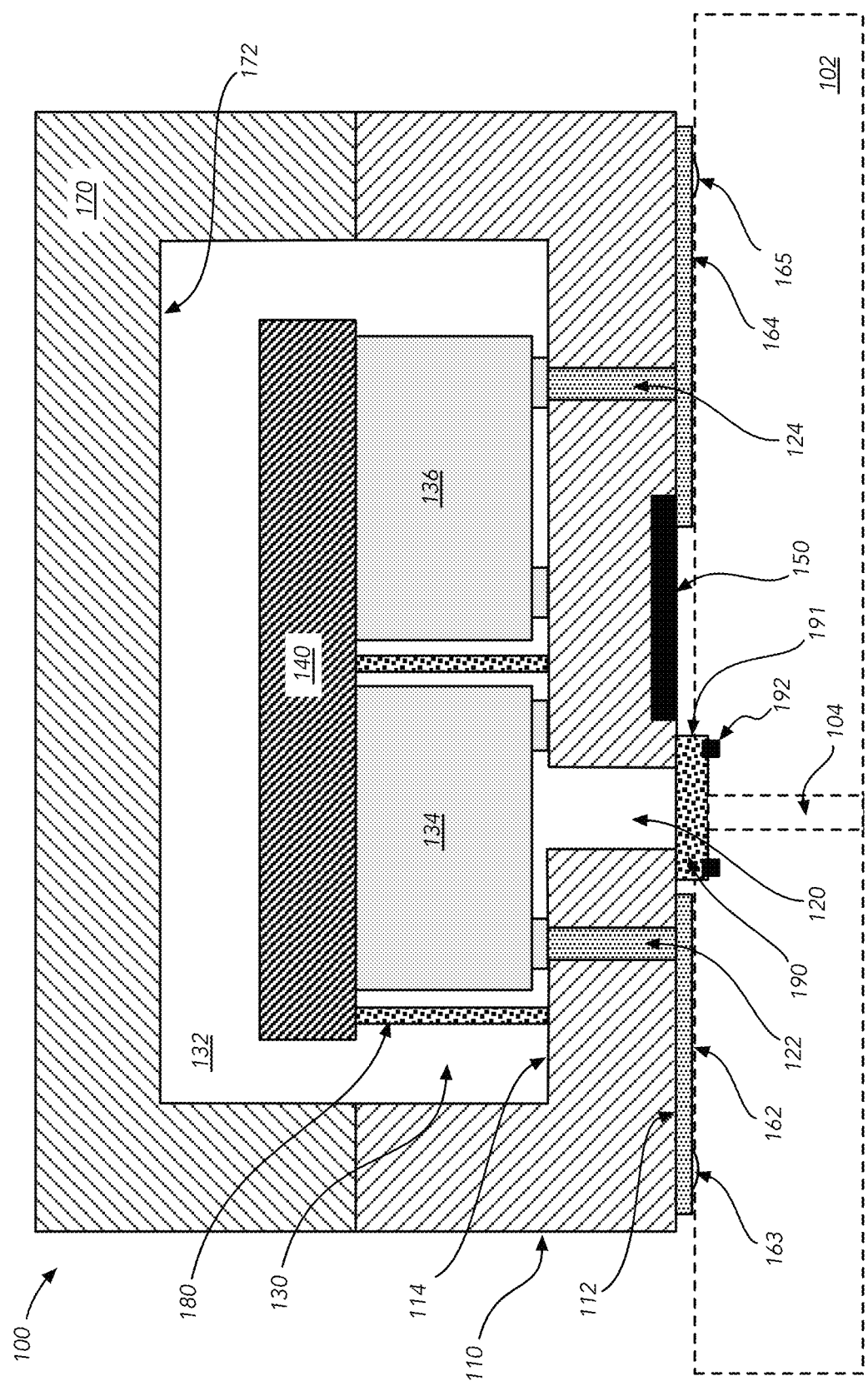
FIG. 1 illustrates a cross-sectional view of an embodiment of a chip-scale package sensor module comprising a cavity package, electrodes, electrolyte, a sensing circuit, and electrical interconnects.

FIG. 1 shows a cross section of an exemplary electrochemical sensor device 100. The device 100 is generally constructed on a base wafer 110. The base wafer 110, can be made of any suitable composition, and as will be explained below, generally allows for construction of and fabrication of components, circuitry and parts on said base wafer 110. In some embodiments, the base wafer 110 is a semiconducting or semiconductor-based wafer such as a silicon wafer. In other embodiments the base wafer 110 comprises a ceramic wafer or a printed circuit board (PCB) panel. Where a ceramic wafer is used for a cap or base herein, any coupled IC components are mounted onto such ceramic layers, while in other embodiments, an IC may be integrated into a surface region of a wafer. The base wafer can be shaped to have a flat or contoured surface. For example, base wafer 110 generally has a thickness and describes a planar slab or disc with two opposing faces. In this example, we call the face of base wafer 110 directed to the outside of the device 100 the externally facing side 112, while its face directed to the inside of device 100 is referred to as the base wafer's internally facing side 114. The externally facing side 112 of base wafer 110 in this example is generally planar or flat. The internally facing side 114 of the base wafer 110 can be carved, etched, sand blasted, molded, cast, printed, machined, deposited, or otherwise formed by any known means of shaping as shown. In some examples, the shape of the internally facing side 114 of the base wafer can be created by deposition of additional layers on top of a flat base wafer to obtain the contoured or shaped cross section desired.

Some embodiments utilize co-fired ceramic wafers for the base and/or lid units. These may be made by: 1. Preparing individual ceramic sheets, slabs or layers, 2. Forming the through vias (electrical conducting filled vias or gas port vias) into one or more layers, 3. Printing electrical interconnect traces on the layers, e.g., to fill the electrically-conducting vias, 4. Aligning the layers with respect to one another, and 5. Co-firing the layers together. This process can be used as reasonable for any given embodiment disclosed herein.

A cap wafer, lid or other cover 170 is disposed against the internally facing side 114 of the base wafer 110 to crate, together with the base wafer a sensor chamber 132 housing the present electrochemical sensor 130. The cap wafer 170 can be a wafer-level, panel-level or die-level member, and like the base wafer, may comprise any suitable composition including glass, silicon, ceramic or polymer. As can be seen, the sensor chamber 132 can be in part described by an internal face 172 of said cap wafer 170. The cap wafer's internally facing side or face 172 can also be carved, etched, sand blasted, molded, cast, printed, machined or deposited using appropriate methods to create or co-define the sensor chamber 132 that houses electrochemical sensor 130.

In an aspect, the sensor chamber 132 can be at least in part defined by the interior sides of the base wafer 110 and cap wafer or lid 170. The sensor chamber 132 can be almost entirely sealed to the outside environment, with the exception of a gas port 120 formed as a through-via in said base wafer 110. The gas port and other through vias 120, 122, 124 extend through the base wafer 110 and specifically, penetrate the base wafer and extend from its externally facing side to its internally facing side. The gas port through via 120 would thus be a way or only way for the gas to pass in/out of the sensor chamber 132. In some embodiments, an optional filter 190 can be placed in or against the gas port through via 120 to selectively filter materials passing through the gas port 120. For example, the filter may be gas permeable, but may be configured and arranged to block or reduce the passage of solid particles greater than a given size, or to block the passage of liquids, certain gases, and so on. In some examples, the filter 190 may adsorb or absorb certain gasses or materials. In some examples, the filter 190 may catalyze certain gases or materials to stop or reduce their propagation through the filter. Filters such as those disclosed in Provisional Applications 62/730,076 and 62/750,926, which are incorporated herein by reference, may be used as a basis for some filter 190 designs and compositions. But such designs may be adapted, added or omitted in the present embodiments as best suits a specific purpose.

Inside the sensor device 100, and more specifically, inside sensor chamber 132 are disposed a plurality of sensor electrodes 134, 136 being part of electrochemical sensor 130. The sensor 130 is responsive to a gas or a property of a gas or a component or material in said gas and delivers an electrical response output or measurable signal responsive to the presence of said gas or gas property. The number of electrodes per sensor 130 can vary and may include three, four or more electrodes. The electrodes include a first working electrode 134 in gas communication with the environment of the device through gas port through via 120. That is, gases in the environment of the device 100 can pass through the gas port 120 and come into contact with the electrochemical sensor 130 by way of its working electrode 134. Gas port 120 can be considered a gas diffusion aperture as it can allow for diffusion of a gas between the external and internal sides of base wafer 110.

Each of the electrodes 134, 136 are contacting or coupled to an electrolyte 140. While in gas isolation from one another by way of a gasket or other blocking material 180, the electrodes 134, 136 are coupled at least on one side by the electrolyte material 140. In the embodiment shown, the electrolyte 140 comprises a layer or slab of some general thickness, and the electrodes 136, 134 are disposed on a same (e.g., lower) face of the electrode 140 material. We note that a plurality of electrodes, including at least a working electrode and another electrode are used. Various embodiments can employ 3-terminal or 3 electrode designs, 4-terminal or 4 electrode designs, and other designs.

In some embodiments, one or more of the electrodes, e.g. the working electrode 140, may comprise a porous material such as a carbon paper, a carbon cloth, or any other porous, electrically-conducting matrix and a catalyst such as platinum, palladium, ruthenium, rhodium, silver, nickel, iron, vanadium, other transition metals and alloys thereof; aluminosilicates, alumina, boron nitrides, other semiconductor catalysts, and mixtures thereof.

The electrolyte material may be a solid or a semi-solid material. In other embodiments, the electrodes can be disposed on opposite sides of electrolyte 140 as shown. This disclosure illustrates and describes a few such embodiments in detail by way of illustration only. Those skilled in the art will appreciate that various ways of arranging the electrodes about the electrolyte are possible, and these ways are comprehended by this disclosure and claims as well.

While some of the present embodiments and exemplary illustrations (e.g., FIG. 1) show the electrolyte layer as 'floating' or disposed freely within the sensor cavity in the device, other embodiments (e.g., FIG. 2) can have the electrolyte extending in thickness so as to touch an internal surface of the proximal wafer. A thicker electrolyte layer that is in contact with its proximal wafer can thus provide mechanical compression by the wafer against the electrolyte to press it against the internal components and better seal the working electrode chamber. The wafers can sandwich the contents of the sensor chamber with an appropriate compression force to hold the contents securely and better seal them. However, those skilled in the art will understand that an adhesive or epoxy can be used to connect some or all of the components of the devices to keep them in place in examples where the electrolyte is not pressed against a wafer surface.

In an aspect of the electrolytes described in the present embodiment and others, the electrolyte may comprise a sieve or sieve-like material, or have a structure and composition causing the electrolyte layer to act as a sieve. More particularly, the electrolyte in some embodiments may act as a selective sieve that is design and configured to block certain materials but not others, e.g., certain gases but not others.

Other silicon through vias, e.g., 122, 124 can be formed in the base wafer 110. These through vias can be filled with a conductor so carry an electrical signal between the inside and outside surfaces of the base wafer 110. Specifically, aside from the first (gas port) through via 120, a second (conducting) through via 122 can be established to contact the first (working) electrode 134. And a third (conducting) through via 124 can be established to contact the second (counter) electrode. It should be noted that in any of the present embodiments, the electrically-conducting through vias may preferably be filled with a conducting material so as to prevent unwanted gas passage therethrough. If an electrically-conducting via is not filled with the conductor, e.g., the conducting material only coats the internal sides of the via, then another material such as a polymeric or similar solid or semi-solid material can be used to plug or fill any gas passages in the electrical through vias.

On the outside, or externally facing side 112 of base wafer 110, other components may be disposed and arranged. First and second electrical contacts 162, 164 can be formed, deposited or manufactured to make electrical contact with the respective conducting through vias 122 and 124. In some examples, solder bumps 163 and 165 can be placed on or in electrical contact with first and second electrical contacts 162, 164 to give the whole device 100 a suitable electrical interface to a greater system in which the device is installed, such as on a printed circuit board, or in a mobile or stationary computing or communication apparatus (e.g., smart phone). The figure shows a board 102 on which the sensor device is disposed, said board 102 built to make electrical connection by way of solder bumps 163, 164. If the device 100 is mounted on or attached to some substrate or circuit board 102, a hole 104 may be formed in this board 102 to allow gas diffusion therethrough and into gas port through via 120. The optional filter 190 may then be moved to cover an entry/exit of either gas port through via 120 as shown, or alternatively to cover an entry/exit of hole 104. These examples are not meant to limit the range of applications in which the device 100 may be utilized but are provided for illustrative purposes of some embodiments and preferred examples.

In addition, the device 100 can include or be coupled to an integrated circuit or ASIC or other circuitry (IC 150) disposed on a surface 112 of base wafer 110. Those skilled in the art will understand that IC 150 can be built on said surface 112 or can be placed in some other location with respect to the sensor device so as to be in communication therewith. The IC 150 can provide a number of functions to the device 100 including processing functions, data storage functions, communication functions and so on as suits a given implementation. In some embodiments, IC 150 can serve as an interface to a system incorporating sensor device 100, for example in a mobile communication or computing device. As stated before, the IC 150 can be disposed onto or manufactured in surface 112 depending on the application and on the material from which base wafer 110 is made. In some embodiments, the IC or ASIC or other circuit above may not be limited to being integrated into ax exterior surface of the device and may be integrated into or onto an internal or other portion of the device.

In an aspect, the IC 150 is used to drive the sensor device cell. In another aspect the IC 150 is used to sense a current generated by the sensor cell in the presence of a detected gas of interest. In the case of multi-electrode sensor devices (e.g., 3-electrodes) the IC 150 can bias the cell appropriately by applying a bias voltage to the reference electrode for example.

Regarding the external attachment and construction of the devices described herein, e.g., device 100 and the other present embodiments, the substrate or circuit board 102 may be substituted with any appropriate cover, layer or casing that acts to protect device 100. In some examples, the devices are made water-proof or water-resistant or impervious to external contamination. In some examples, the layer 102 comprises a cover or housing can facilitate simple manufacturing processes that result in IP6x-compliant sensor devices.

As can be seen, the resulting arrangement of device 100 can yield a capped enclosure or chamber, on a silicon or similar base wafer, with a sensor 130 disposed in said enclosure or sensor chamber. The sensor chamber can be defined by recesses in one or both of the base and cap wafers, or by separating the base and cap wafers with a suitable spacer. Within the sensor chamber, a plurality of cavities can be defined by the gaskets or other internal structures that form separate cavities for the electrodes. One such cavity is made to have gas communication with the exterior environment around the device so that a gas in the environment can contact the working electrode 134 and allow for sensing of the gas.

We will present other exemplary embodiments below, in which two or more electrodes of an electrochemical sensor are contained in a sensor chamber as described. The various designs and embodiments can include additional electrodes in contact with the electrolyte material, and the various designs can differ in their arrangement of the placement of the electrodes, the method of spacing the base and cap wafers, etc. to suit a given application. For example, the base and cap wafers in some embodiments are etched, carved, formed or otherwise shaped to define the sensor chamber between said wafers. However, the base and/or cap wafers may, alternatively, be substantially flat or slab or disc shaped, but spaced apart using a spacer wafer or material such as glass or silicon, having optional through vias (through silicon or through glass vias) to make the needed connections through these layers.

In the instantiation in FIG. 1, a segment of the surface of the base wafer 110 forming the partially-enclosed cavity has been recessed, for example, by etching. For a given required height of the partially-enclosed cavity, partial recessing of the base wafer in this manner enables the recess in the cap wafer to be reduced, potentially facilitating formation of the cap. However, depending on the method of formation of the cap, forming a deep recess in the cap may be straightforward. In this case, recessing of the base wafer may offer no particular advantage and may be omitted.

In an alternative instantiation, the IC 150 may be located on the same surface of the silicon base wafer 110 on which the electrodes are attached. In this scheme, it may be protected from the contents of the electrochemical cell by the application of one or more appropriate dielectric or other chemically-resistant layers. While a number of design options are possible, those skilled in the art will understand that the IC 150 may be integrated into the base wafer 110, but may also be constructed thereon, for example if the base wafer is made of ceramic The present sensor devices can be manufactured using some or many steps from within the relevant industry, but also using novel steps, especially as to the sequence and nature thereof. These steps can include one or more optional steps, so they may not all be required. Also, the order of performing the steps can vary as appropriate for a given device and process, so the steps herein are listed in an exemplary and illustrative way only. With regard to the device 100 of FIG. 1, it may be constructed using the following method, which is also hereby presented as a novel aspect of this invention: The cap wafer and base wafer are formed; the base wafer is optionally cavity etched; the through vias described are then formed in the appropriate wafer; the cavity or sensor chamber side interconnects are formed and established; the outside electrodes (for connection to external circuits) are formed; electrodes and/or contact points are disposed as necessary to connect the relevant electrical components; an optional gasket is put in place to establish optional sub-chambers within the sensor chamber; the electrolyte material (in some embodiments a slab or layer of electrolyte) is put against the electrodes in the sensor chamber; attach the cap wafer, die level or panel to the lower parts; install optional solder bump wafer; install optional gas filter over the gas port; test the wafer and/or device; and singulate the wafer(s) to make individual components by cutting or dicing the wafers. Testing may be performed before and/or after singulation.

Figure 2:
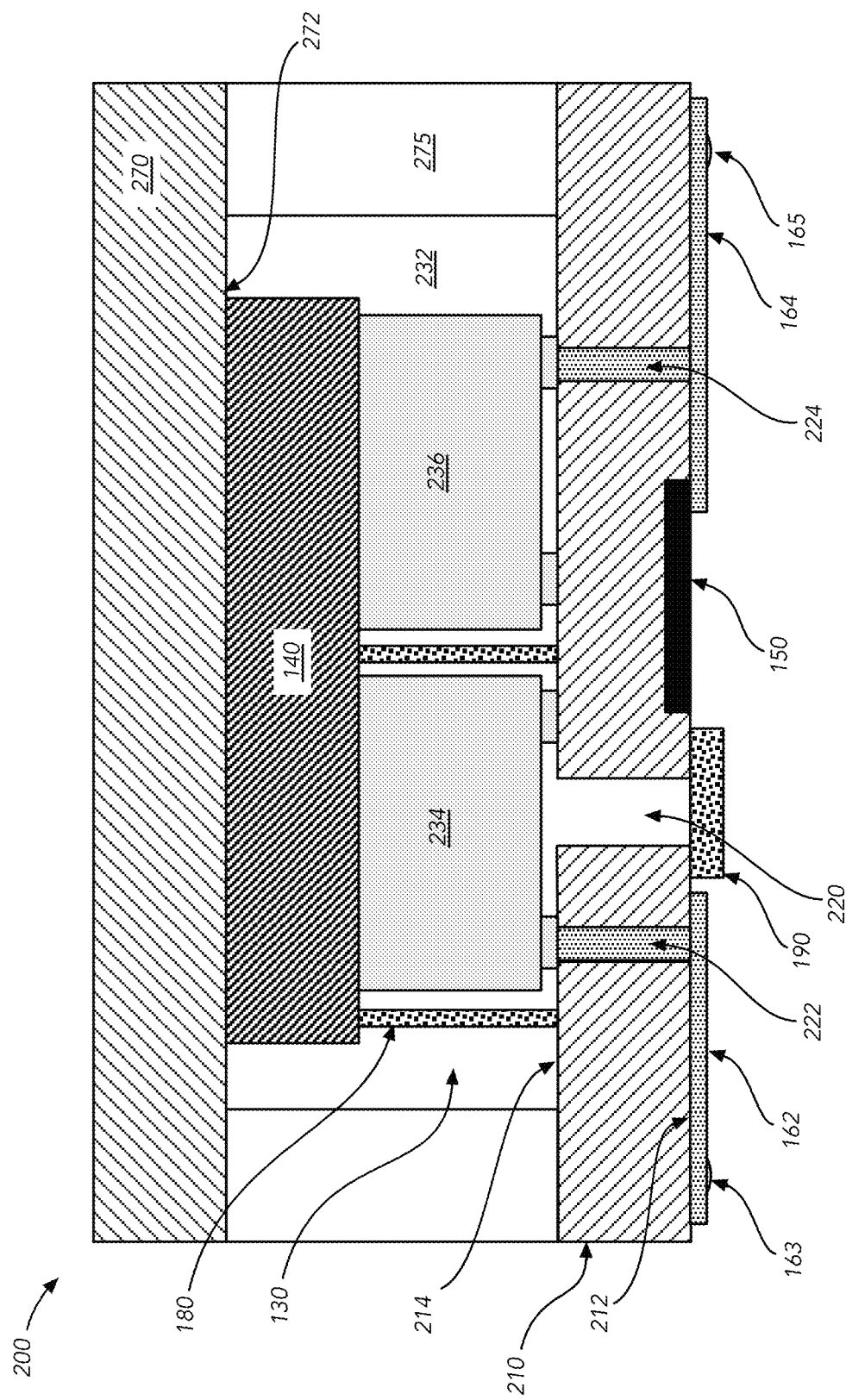
FIG. 2 illustrates a cross-sectional view of an alternative embodiment of a chip-scale package sensor module comprising a cavity package, electrodes, electrolyte, a sensing circuit, and electrical interconnects.

FIG. 2 describes another embodiment of an electrochemical sensor device 200 according to this invention. In this embodiment, the partially-enclosed sensor chamber 232 is defined using two substantially planar or flat wafers, e.g., base wafer 210 and cap wafer 270 as well as one or more spacers 275. The spacers may comprise a spacer wafer 275 bonded, adhered or attached to each of the opposing base wafer 110 and cap wafer 270, shown below and above the spacer 275 in the figure.

The spacer wafer 275 (and other wafers or panels described herein) may have a relatively large form factor and include through-vias in the spacer wafer, made for example by dry etching, wet etching or sand blasting or other subtractive manufacturing processes. Alternatively, the spacer wafer 275 may be cast, molded, stamped, milled, drilled, machined, or printed with the through-vias formed as part of the forming process such that no additional processing is required to form the vias. Where co-fired ceramic panels or wafers are used, the wafer may be formed as described herein.

The electrochemical sensor 130 here is disposed in a sensor chamber 232 defined at least in part by each of the lower/internally facing side 272 of cap wafer 270, the upper/internally facing side 214 of base wafer 210 and the spacer(s) 275. The base wafer 210 has a lower/externally facing side 212. As before, a gas port 220 or gas diffusion aperture is formed with a through via in base wafer 210, while conducting or conductor-filled through vias 222, 224 connect the internal sensor electrodes 234, 236 to the outside world. The interconnection and use of the device 200 is similar to or the same as described above with respect to earlier embodiment 100.

The sensor device 200 can be manufactured using some or many steps from within the relevant industry, but also using novel steps, especially as to the sequence and nature thereof. These steps can include one or more optional steps, so they may not all be required. Also, the order of performing the steps can vary as appropriate for a given device and process, so the steps herein are listed in an exemplary and illustrative way only. With regard to the device 200 of FIG. 2, it may be constructed using the following method, which is also hereby presented as a novel aspect of this invention: The base or IC wafer is formed; the through vias described are then formed in the appropriate wafer; the cavity or sensor chamber side interconnects are formed and established; the spacer wafer or plate is established or installed or attached; electrodes and/or contact points are disposed as necessary to connect the relevant electrical components; an optional gasket is put in place to establish optional sub-chambers within the sensor chamber; the electrolyte material (in some embodiments a slab or layer of electrolyte) is put against the electrodes in the sensor chamber; attach the cap wafer, die level or panel to the lower parts; install optional solder bump wafer; install optional gas filter over the gas port; test the wafer and/or device; and singulate the wafer(s). Other steps as described in the context of other embodiments herein may be included, omitted, substituted or performed in any order that suits a given embodiment as would be appreciated by one of ordinary skill in the art.

Figure 3:
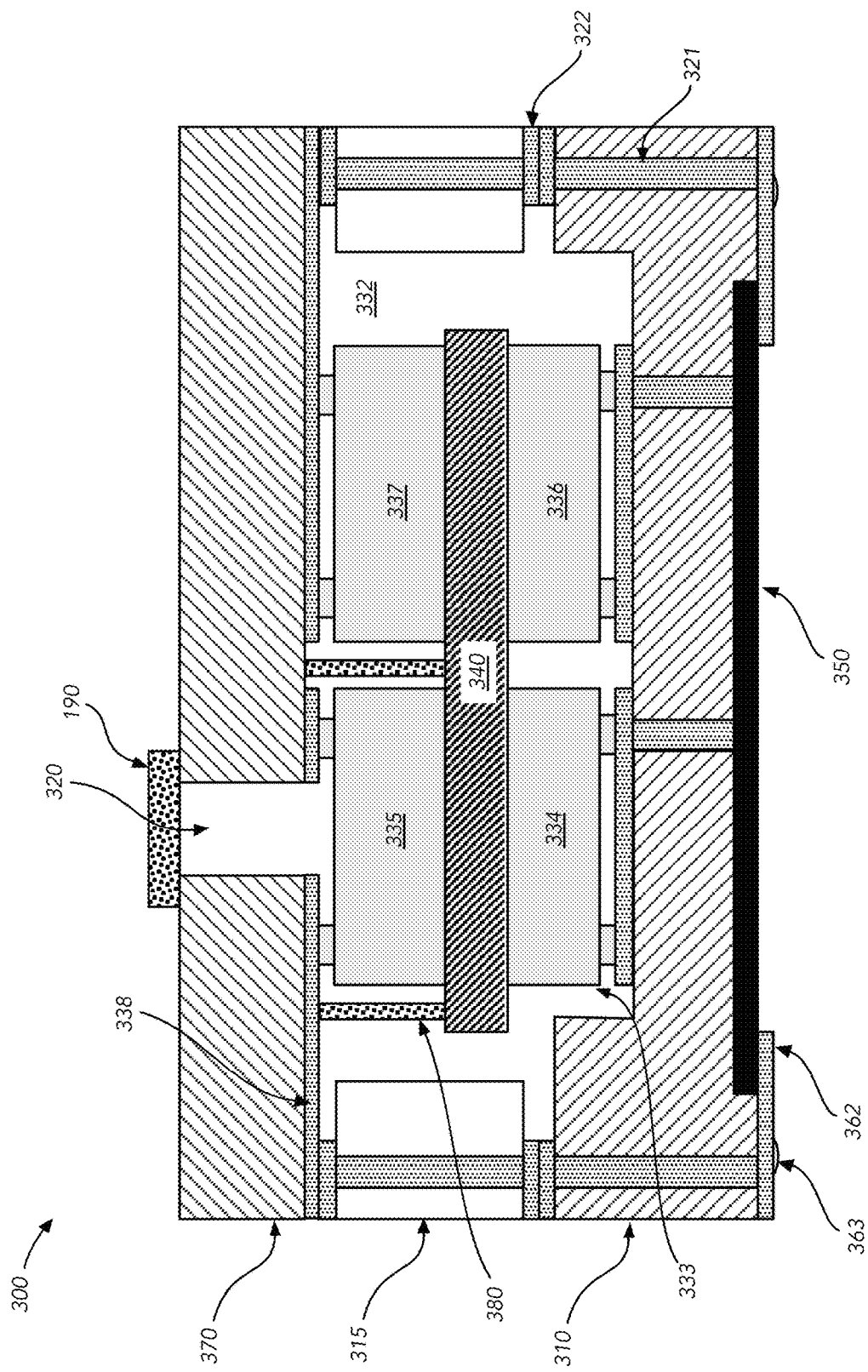
FIG. 3 illustrates a cross-sectional view of an alternative embodiment of a chip-scale package sensor module comprising a cavity package, electrodes, electrolyte, a sensing circuit, and electrical interconnects.
Figure 5:
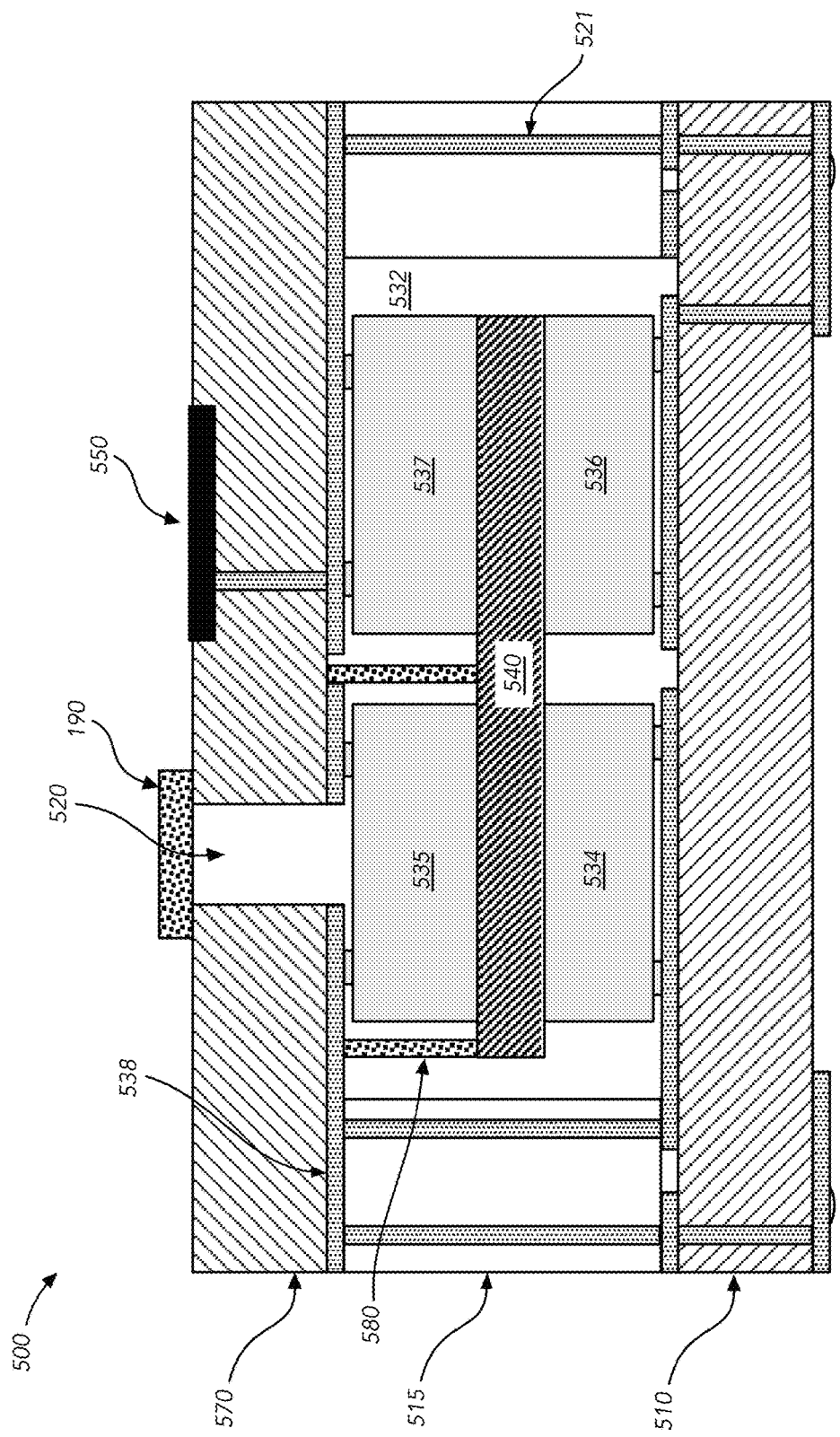
FIG. 5 illustrates a cross-sectional view of an alternative embodiment of a chip-scale package sensor module comprising a cavity package, electrodes, electrolyte, a sensing circuit, and electrical interconnects.
Figure 6:
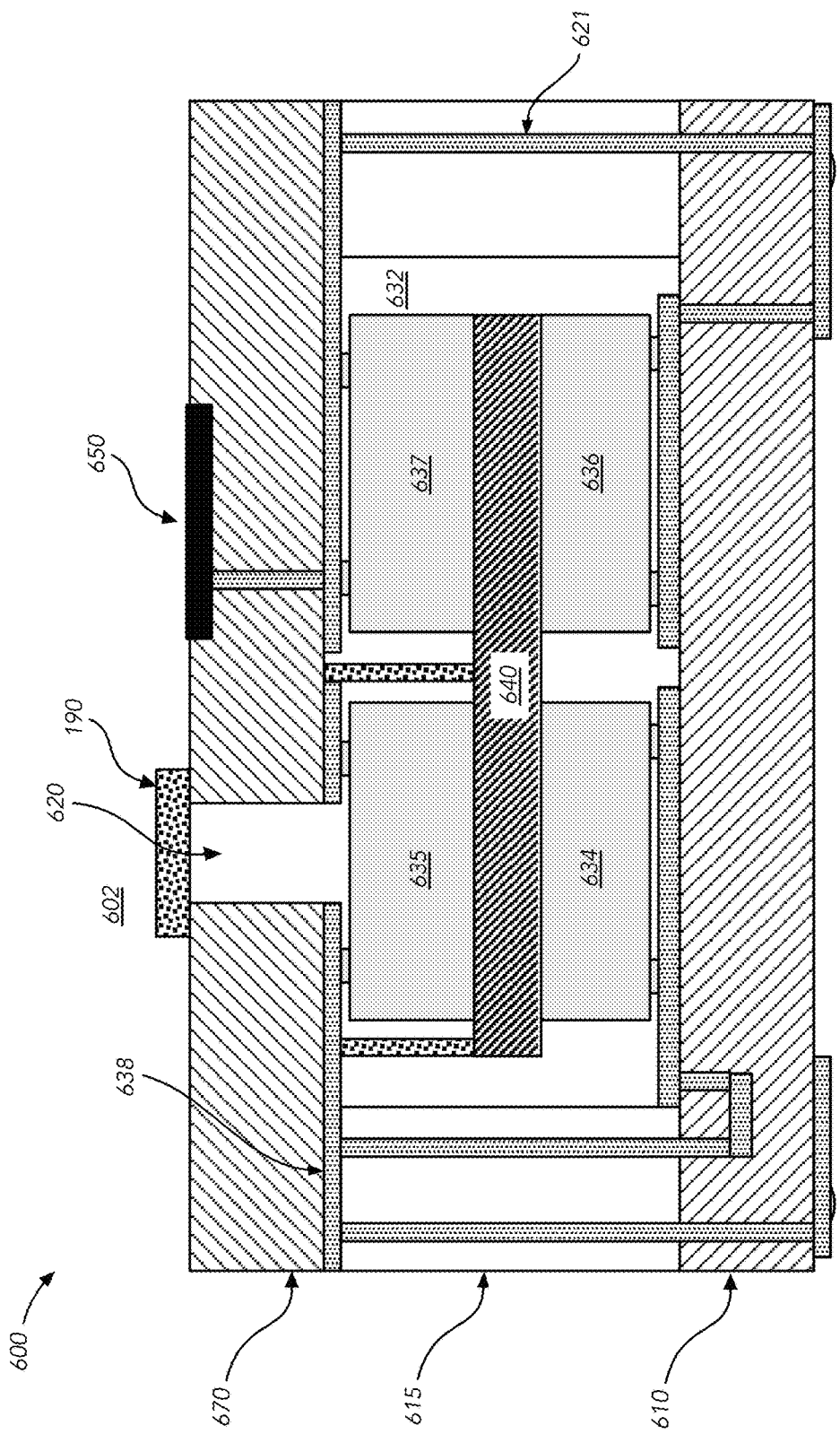
FIG. 6 illustrates a cross-sectional view of an alternative embodiment of a chip-scale package sensor module comprising a cavity package, electrodes, electrolyte, a sensing circuit, and electrical interconnects.

FIG. 3 illustrates another electrochemical sensor device 300, which can be manufactured and used according to the present disclosure. Again, a pair of generally parallel wafers or substrates (IC die wafer 310 and cap or lid wafer 370) partially define an internal space that acts as a sensor chamber 332. The sensor chamber 332 is also partially defined by spacer wafers or panels 315, which give some separation between the base wafer 310 and cap wafer 370. The wafers 310 and/or 370 may optionally be etched, machined, cut or shaped as described earlier to optionally form deeper recesses to enlarge or partially define the sensor chamber 332. In FIGS. 3, 5, 6, electrical through vias are required within the spacer wafer. Hence the spacer wafer design and construction may vary and may include electrically-conducting vias and the fabrication of the spacer wafers may include steps of forming and/or filling the conducting vias therein.

The electrolyte material 340 is disposed within the sensor chamber 332. Electrolyte material 340 may comprise a single-phase solid or semi-solid electrolyte. The electrolyte may alternatively comprise a matrix such as a polymer matrix imbibed with a electrolyte—and capable of performing the functions of an ion bridge between the various electrodes. Example matrix materials comprise polybenzimidazole (PBI) or its derivatives, TPS or its derivates, perfluorosulfonic acid, Nafion or its derivatives, co-polymers or blends of the above materials with other polymers such as polytetrafluoroethylene (PTFE), any suitable material able of performing as a proton exchange membranes (PEM) or any other material suitable to the function—such as any material which might be used in the manufacture of a PEM for a fuel cell. Examples of imbibed electrolytes include sulfuric acid, phosphoric acid, or any inorganic or acid suitable for providing ionic conductivity between electrodes in an electrochemical cell. Electrolytes may also include zwitterionic materials. Contacting said electrolyte 340 are a plurality of sensor electrodes 334, 335, 336, 337. Those skilled in the art will understand that a number of configurations of this device are possible, but we present here one or more preferred embodiments for illustration.

The cap wafer 370 in this embodiment has one gas port through via 320 passing through the thickness of wafer 370 to allow diffusion of a gas from an outside environment into the gas port to be sensed by a first sensor electrode 335 that used as a working electrode. Optionally, filter 190 can be used to filter gases passing therethrough. Counter electrodes and other electrodes 334, 336, 337 are in contact with the same electrolyte material 340 contacting the working electrode 335.

An integrated circuit (IC) 350 is disposed on a surface of the base wafer 310. The IC can provide an interface, logic or other function as described herein and known to those skilled in the art. To achieve electrical connection between the sensor electrodes and the IC 350, a plurality of through vias 321 are provided that penetrate the wafers, including the spacer wafers 315 so as to reach from the electrode contacts 338 to IC 350. The spacers 315 may comprise silicon, glass, or another material such as co-fired ceramic, ceramic with vias and contacts formed after firing, or printed circuit board (PCB).

The drawing is simplified to show what is necessary to appreciate the construction of the embodiment, and so not every through via is separately numbered in these examples, nor is every electrical contact point. But those reading this disclosure will appreciate that like-constructed components are provided as shown and operate as described herein. Conducting contact points or layers 322 are provided as needed to electrically connect the various members of device 300 where suitable. Also, the device 300 can be mounted to a PCB or flexible circuit board or similar sub-unit of a larger system, and can receive and/or transmit electrical signals through electrical contact 362 and solder bumps or other pin connections 363.

One or more electrodes can be gas isolated from the others using gasket material 380, which can further effectively subdivide the sensor chamber 332 into more than one sub-chamber or electrode space 333 within said sensor chamber. This aspect is true for other embodiments presented in this disclosure, and it is possible to consider the one or more sub-chambers or electrode spaces within the overall sensor chamber based on the gasket 380 or other dividing materials between the respective sub-chambers 333. Various gasketing features are disclosed in the present document, which can apply to one or more of the invention's embodiments.

The gaskets referred to herein, for example 180, 380 (et al) may be deposited as a liquid that cures once in place or may be pre-formed according to the shape and dimensions needed, which pre-formed gaskets are then picked and placed into position within the sensor device.

The gaskets 180, 380 (et al) substantially block or exclude gases from passing across a barrier defined by the gaskets. In some aspects, the gaskets 180, 380 (et al) may comprise a fully airtight and gas-isolating seal. But in alternative embodiments, the gaskets 180, 380 (et al) could be designed and arranged to permit slight leakage of certain gases, e.g., small molecule gases like oxygen or hydrogen and others, while blocking passage of larger gas molecules such as carbon monoxide or carbon dioxide and others. In an example, the gasket material may be designed and configured to allow some water vapor gas to pass across the gasket material.

The sensor device 300 can be manufactured using some or many steps from within the relevant industry, but also using novel steps, especially as to the sequence and nature thereof. These steps can include one or more optional steps, so they may not all be required. Also, the order of performing the steps can vary as appropriate for a given device and process, so the steps herein are listed in an exemplary and illustrative way only. With regard to the device 300 of FIG. 3, it may be constructed using the following method, which is also hereby presented as a novel aspect of this invention: The base or IC wafer is formed; we optionally etch the cavity or sensor chamber; the through vias described are then formed in the appropriate wafer; the cavity or sensor chamber side interconnects are formed and established; the spacer wafer or plate is established or installed or attached, e.g., by bonding it at the proper locations; electrodes and/or contact points are disposed as necessary to connect the relevant electrical components; an optional gasket is put in place to establish optional sub-chambers within the sensor chamber; the electrolyte material (in some embodiments a slab or layer of electrolyte) is put against the electrodes in the sensor chamber; attach the cap wafer, die level or panel to the lower parts, which can include forming the cap wafer with its gas port via and attaching respective conducting contacts or electrodes to the cap wafer; install optional solder bump wafer; install optional gas filter over the gas port; test the wafer and/or device; and singulate the wafer(s). As discussed with respect to related embodiments herein, other steps can be included or omitted as suits a given implementation. For embodiments having multiple adjacent or bonded wafer elements, a conductive bond section using electrically conducting bonding agents can be used. Also, conducting vias are formed in spacer panels or wafers where necessary to connect circuit elements above and below the spacers.

Figure 4:
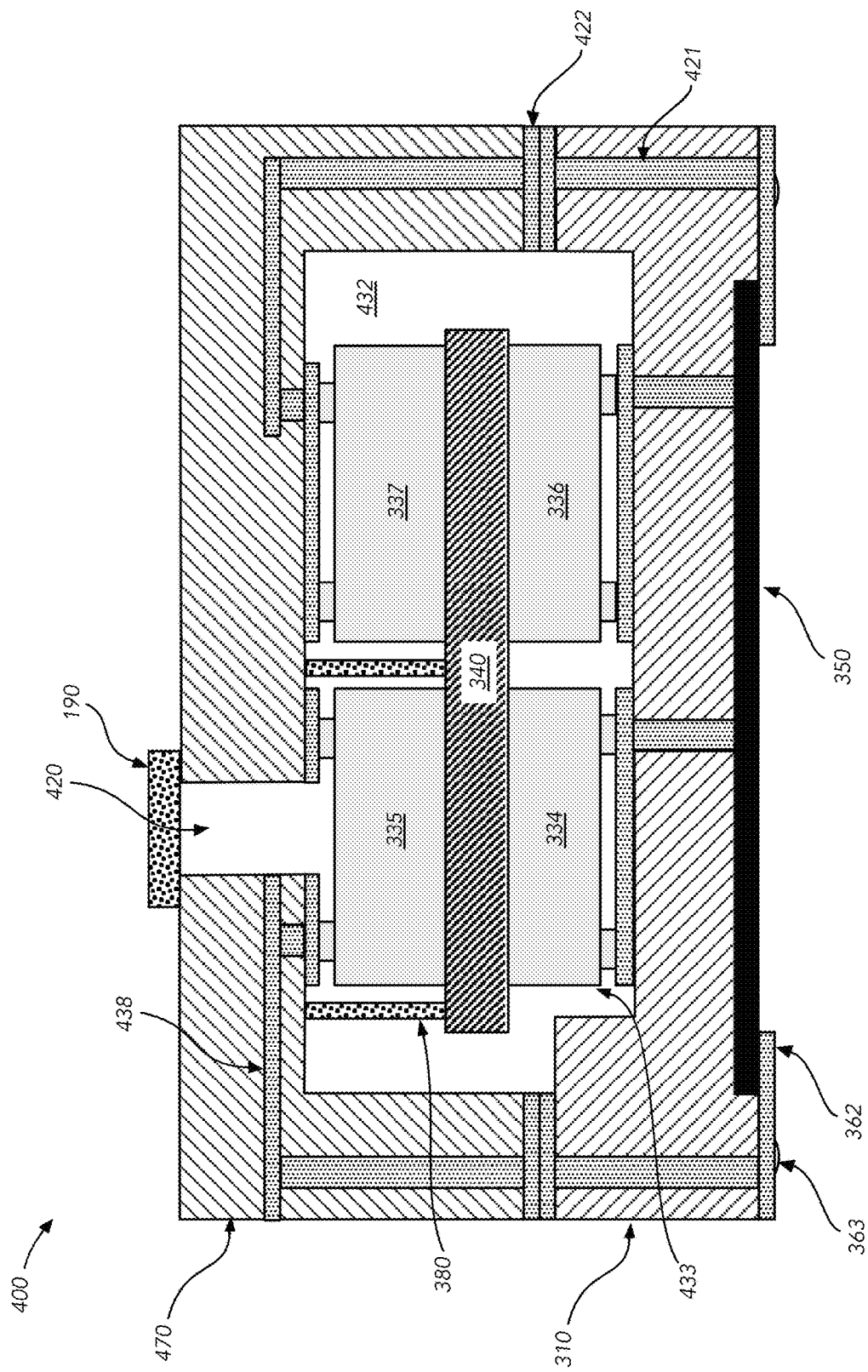
FIG. 4 illustrates a cross-sectional view of an alternative embodiment of a chip-scale package sensor module comprising a cavity package, electrodes, electrolyte, a sensing circuit, and electrical interconnects.

FIG. 4 extends or modifies the present disclosure and shows another electrochemical sensor device 400 based on a pair of substantially parallel and planar wafers, e.g., base wafer or substrate 310 and lid or cap wafer 470. In this instantiation, the partially-enclosed sensor chamber 432 is formed without the need for a separate spacer member between the two foregoing wafers. One or both of wafers 310 and 470 may comprise a multi-layer co-fired ceramic or PCB, or any other appropriate laminate structure. The top (cap) wafer 470 has the gas port through via 420 therein, optionally filtered by filter 190 as mentioned before. Conducting vias and contacts 421, 422 may be created in the wafer structures as described before. In some embodiments, the lateral elements 438 may be formed on the topside of the lid wafer and not part-way through the thickness of the lid as shown in the figure.

In some embodiments, glass or silicon wafers or panels are used. Here, interconnects embedded in the silicon or glass wafers may not be possible or economically justified. Instead, in an aspect, the electrical interconnects may be performed only on the top-side or bottom-side of the cap wafer, or a combination of the foregoing. In other embodiments, co-fired ceramic panels or wafers are used, in which embedded interconnects may be employed, in a PCB or 3D printed substrate architecture.

The sensor device 400 can be manufactured using some or many steps from within the relevant industry, but also using novel steps, especially as to the sequence and nature thereof. These steps can include one or more optional steps, so they may not all be required. Also, the order of performing the steps can vary as appropriate for a given device and process, so the steps herein are listed in an exemplary and illustrative way only. With regard to the device 400 of FIG. 4, it may be constructed using the following method, which is also hereby presented as a novel aspect of this invention: The base or IC wafer is formed; we optionally etch the cavity or sensor chamber; the through vias (e.g., silicon or glass vias) described are then formed in the appropriate wafer; the cavity or sensor chamber side interconnects are formed and established; electrodes and/or contact points are disposed as necessary to connect the relevant electrical components; an optional gasket is put in place to establish optional sub-chambers 433 within the sensor chamber; the electrolyte material (in some embodiments a slab or layer of electrolyte) is put against the electrodes in the sensor chamber; attach the cap wafer, die level or panel to the lower parts, which can include forming the cap wafer with its gas port via and attaching respective conducting contacts or electrodes to the cap wafer; install optional solder bump wafer; install optional gas filter over the gas port; test the wafer and/or device; and singulate the wafer(s).

FIG. 5 Illustrates yet another embodiment of an electrochemical sensor device 500 wherein the base wafer 510 is formed from a glass wafer with glass through vias and electrical redistribution. A silicon wafer with silicon through vias and electrical redistribution, a PCB panel or a ceramic panel with vias and electrical connections may alternatively be used. In this instantiation, the cap wafer 570 of the partially-enclosed sensor chamber 532 comprises the IC die and a gas port through via 520. A spacer layer or wafer or plate 515 is used to define the height of the partially-enclosed cavity 532 and provide the electrical interconnection between the lid and base wafers. As before, one or more gaskets 580 can subdivide the sensor chamber 532. The electrodes 535, 534, 536, 537, contact an electrolyte material 540, and are coupled to the electrical conduction ways illustrated in the cross section by conducting plates, contacts or similar means 538 that carry electrical current among the respective vias 521 penetrating the structures of device 500.

It is noted that in all of the present examples an IC (e.g., 150, 550) may be integrated into one of the wafers as suits a given application. However, it will be appreciated that the sensor devices 100, 500 and others may be prepared without an integrated IC circuit, but rather, connections to an external circuit such as an IC that is not part of the device could be achieved as well.

While the illustration shows the working electrode 535 being gas isolated by gaskets 580, alternative embodiments may add additional gasketing material between the other electrodes and their sub-chambers so as to gas-isolate, substantially gas-isolate, or selectively gas-isolate each of the electrodes from the other.

The sensor device 500 can be manufactured using some or many steps from within the relevant industry, but also using novel steps, especially as to the sequence and nature thereof. These steps can include one or more optional steps, so they may not all be required. Also, the order of performing the steps can vary as appropriate for a given device and process, so the steps herein are listed in an exemplary and illustrative way only. With regard to the device 500 of FIG. 5, it may be constructed using the following method, which is also hereby presented as a novel aspect of this invention: The base or IC wafer is formed as a cap wafer; we optionally etch the cavity or sensor chamber; the gas through via is established in its respective plate or wafer element; the other through vias (e.g., silicon or glass vias) described are formed in the appropriate wafer; the cavity or sensor chamber side interconnects are formed and established; the glass spacer wafer or plate is established or installed or attached, e.g., by bonding it at the proper locations; electrodes and/or contact points are disposed as necessary to connect the relevant electrical components; an optional gasket is put in place to establish optional sub-chambers within the sensor chamber; the electrolyte material (in some embodiments a slab or layer of electrolyte) is put against the electrodes in the sensor chamber; attach the glass base wafer, die level or panel to the other device parts, which can include forming the base glass wafer with its electrodes and attaching respective conducting contacts or electrodes thereto; install optional solder bump wafer; install optional gas filter over the gas port; test the wafer and/or device; and singulate the wafer(s).

FIG. 6 illustrates another cross-sectional embodiment of an electrochemical sensor device 600. Once again, a plurality of electrodes 634, 635, 636, 637 are disposed in a sensor chamber 632 at least partially defined by a base wafer or plate or substrate member 610 and a lid or cap wafer or plate or substrate member 670 including a gas port via 620 connecting a working electrode 635 to an external gas environment 602, as well as connecting separators or spacer elements 615, which may be multi-layer ceramic or PCB package elements with cavities and electrical vias 621 passing therethrough. In this exemplary embodiment, the base wafer 610 is formed from a multi-layer ceramic, PCB, or other appropriate composite material, and the cap wafer 670 comprises an IC die. The base wafer 610 may alternatively comprise a silicon wafer with through silicon vias (TSVs) or a glass wafer with through glass vias (TGVs) as described herein, or other appropriate substrate providing interconnection between its upper and lower surfaces. As stated elsewhere, an IC 650 may be manufactured and mounted onto a suitable wafer on an outer surface thereof (e.g., for glass wafer applications), or the IC 650 may be made integrated into the wafer 670 if the manufacturing process therefore allows.

Figure 7:
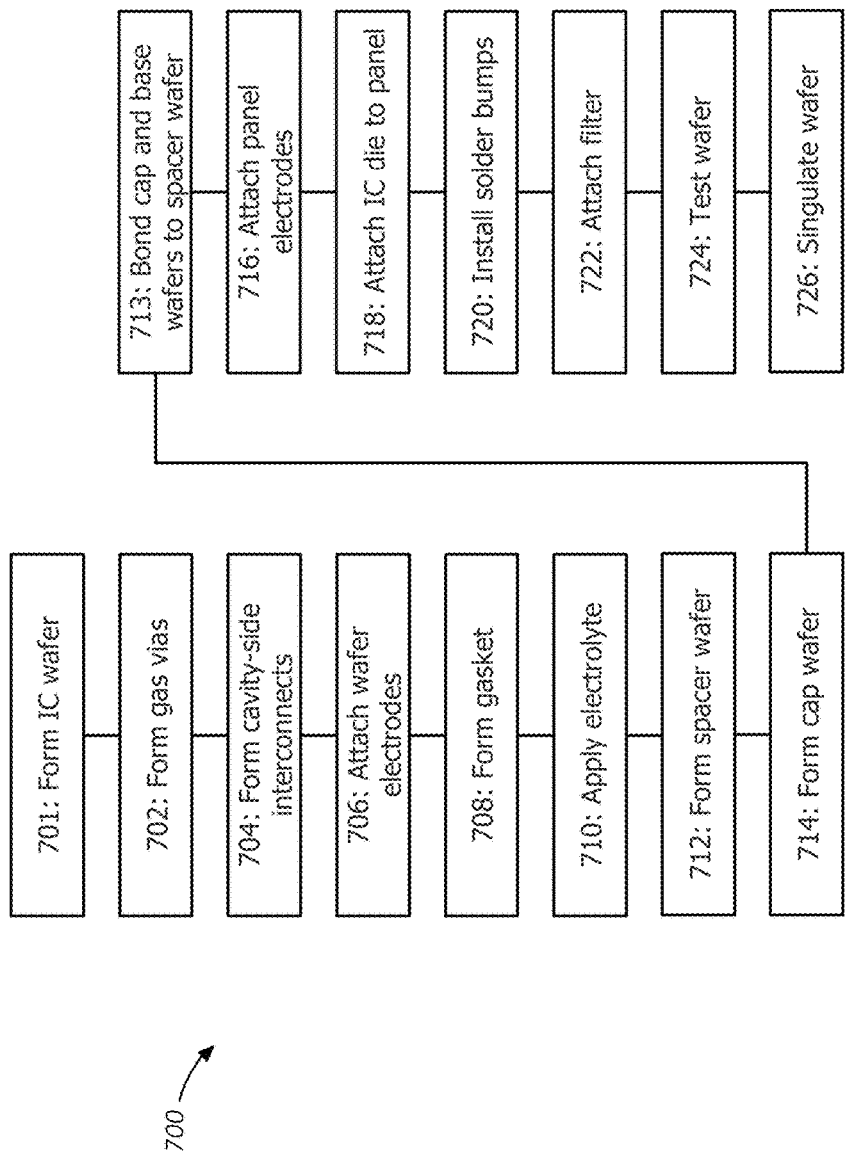
FIG. 7 illustrates an exemplary method for making said devices.

FIG. 7 illustrates an exemplary process or method 700 for making the present devices, generally, with the example of device 600 being used for illustration. Those skilled in the art will understand how this illustration equally applies to the other methods and steps recited herein, and equivalent methods as well. These steps can include one or more optional steps, so they may not all be required. As some examples, we have stated that the application of spacer wafers, gas filters, and gaskets are not required in each embodiment, and so these and similar acts or processes can be substituted or omitted or replaced, in a number of ways. Also, the order of performing the steps can vary as appropriate for a given device and process, so the steps herein are listed in an exemplary and illustrative way only. As one example of this, the testing and singulating or dicing up of a wafer can be performed in either order, first testing the multi-sensor array on a wafer as a whole, or alternatively, cutting up, dicing or singulating the sensors on a wafer into individual sensor devices that are tested after singulation.

With regard to the device 600 of FIG. 6 and others, it may be constructed using the following method, which is also hereby presented as a novel aspect of this invention: The base or IC wafer is formed as a cap wafer at 701; the gas through via is established in its respective plate or wafer element at 702; the other through vias and cavity-side interconnects (e.g., silicon or glass vias) are formed at 704; electrodes and/or contact points are disposed as necessary to connect the relevant electrical components at 706; an optional gasket is put in place to establish optional sub-chambers within the sensor chamber at 708; the electrolyte material (in some embodiments a slab or layer of electrolyte) is put against the electrodes in the sensor chamber at 710; a spacer wafer is formed at 712 and a lid or cap wafer at 714; the cap and base wafers are bonded to one another or to a spacer wafer at 713; the die is attached to a formed ceramic or PCB package panel having electrodes attached thereto at 714, 716 and 718; install optional solder bumps to wafer at 720; install optional gas filter over the gas port at 722; test the wafer/panel and/or device at 724; and singulate the panel or wafer(s) at 726.

It can thus be seen that the base and cap wafers of some embodiments of the present sensor device are separated by a distinct separator plate or wafer (e.g., in FIGS. 3, 5 and 6), while in other embodiments, the cap and base wafer are separated by sidewalls made integrally or monolithically from at least one of said base and cap wafers (e.g., in FIGS. 1 and 4).

As discussed elsewhere, it is desired in some embodiments that the sensor device be IP6x compatible. Referring to FIG. 1, but applicable generally, the present invention can optionally include in the filter 190 (et al) design a hydrophobic and/or oleophobic material to prevent certain contaminants and substances from entering the sensor chamber spaces. The filter 190 can be porous, and the porosity can be defined by a general characteristic pore size and nature to meet required dust (solid particulate) and waterproofing needs and standards. Additionally, the sides of filter 190 (e.g., 191) can be sealed to prevent incursion of outgassing gases from the internal components of the system into the gas sensor when the filter is mounted against or pressed against or sealed against an IP6x compatible frame or housing 102. Optionally, filter 190 may be equipped with a gasket or adhesive 192 to aid in sealing the filter against the frame or housing 102 on which the sensor 100 is mounted. While the figures shows are simplified representations, those skilled in the art will understand that the gasket or adhesive 192 is to be applied between filter 190 and substrate or housing 102.

In some embodiments, a gasket was described. More generally a seal can be formed (either from existing structural materials, e.g., the wafers and/or the electrolyte or using specific gasketing material). So the gas seal providing the present gas isolation of one or more electrode chambers from the others may comprise a gasket or gaskets. It is to be understood that the working electrode is not the only electrode chamber that could be provided with a gas port through via. One or more of the other electrodes may be provided with external gas through a provided gas port through via as well. Similarly, when sealing the respective one or more electrode chambers from one another in various optional examples, the other electrode chambers may be the ones sealed instead of and/or in addition to the working electrode chamber. For example, a seal comprising a gasket as described herein can be applied to, above and/or below the solid or semi-solid electrolyte so as to gas isolate any or all of the electrodes and electrode chambers from one another. The gasket can be press-formed or fit where it is in compression from other members given herein to provide the gas isolation as stated.

In some examples a solid or semi-solid electrolyte material was described. It should be understood that in some or all embodiments, the electrolyte would be made to resist a certain amount of mechanical force or pressure, e.g., by not being a fluid electrolyte, but rather by being a solid or semi-solid material, which has certain solid/semi-solid material mechanical properties (e.g., density, stress-strain, hardness, non-pliability and so forth).

Figure 8:
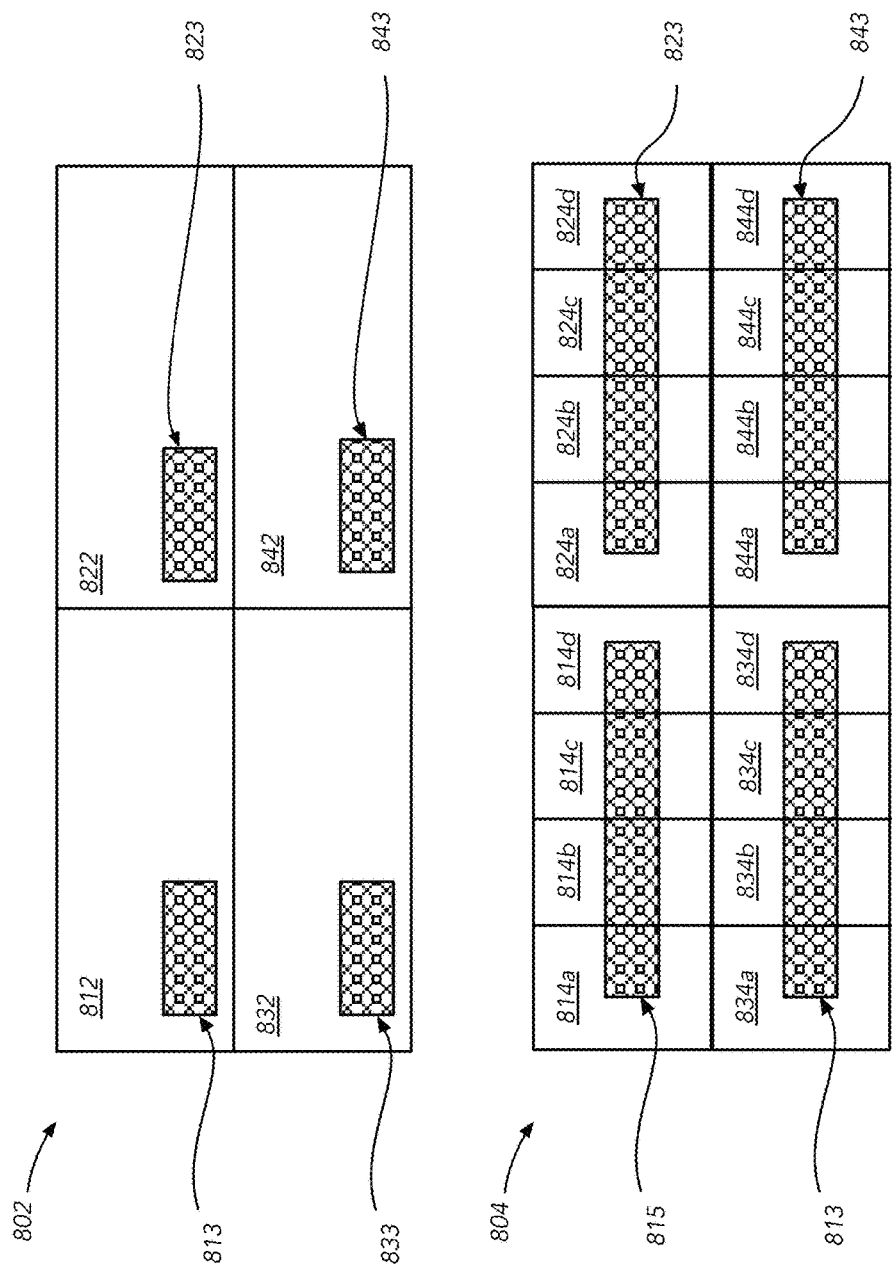
FIG. 8 illustrates multiple sensor devices formed from a common wafer set, including optionally having a multi-sensor device with multiple sensors therein.

FIG. 8 illustrates one example of a common wafer 802 on or in which a plurality of sensor devices 812, 822, 832, 842 as described above can be formed using manufacturing techniques described herein. In the example 802, each sensor device is made with its own integrated circuit 813, 823, 833, 843, respectively. Then, the devices can be singulated to create four individual functional electrochemical sensor devices as described herein by dicing or cutting or otherwise separating them into individual parts. In other embodiments, such as shown at 804, multi-sensor devices are provided. For example, one multi-sensor device has four different electrochemical sensor devices 814a, 814b, 814c and 814d therein. These have an integrated circuit 815 that can determine any of several different gasses, for example if each of the separate sensor devices 814a, 814b, 814c and 814d is sensitive to one such different gas. In another example, a second multi-sensor device has four different electrochemical sensor devices 824a-d having an integrated circuit 823 that can determine any of several different gasses, for example if each of the separate sensor devices 824a-d is sensitive to one such different gas. In yet another example, a third multi-sensor device has four different electrochemical sensor devices 834a-d having an integrated circuit 813 that can determine any of several different gasses, for example if each of the separate sensor devices 834a-d is sensitive to one such different gas. In yet another example, a fourth multi-sensor device has four different electrochemical sensor devices 844a-d having an integrated circuit 843 that can determine any of several different gasses, for example if each of the separate sensor devices 844a-d is sensitive to one such different gas.

The present devices can have separate integrated circuits, or they can share one integrated circuit among more than one sensor device as needed.

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described. For example, electrochemical electrodes may be placed entirely on any one surface of the partially-enclosed cavity, or placed on multiple surfaces of the of the partially-enclosed cavity; the integrated circuit may comprise a monolithic circuit formed in one of the packaging elements, or may comprise multiple, dissociated integrated circuits formed in one or more of the packaging elements; integrated circuits may be formed in any appropriate semiconducting material; the sensing module may comprise multiple electrochemical cells, each cell having a unique combination of electrodes and electrolyte so as to improve the selectivity and range of gasses which can be detected; the flow of the outlined assembly processes may be re-ordered whilst still achieving an identical or substantially identical outcome; assembly may be performed at the wafer level, at the coupon level, at the panel level, at the die level, at the gang-level, via chip-on-wafer processes, via chip-on-panel processes, or via multiple of these and other techniques.

What is claimed is:

1. A chip-level electrochemical sensing device, comprising:
    a base wafer having an externally facing side and an internally facing side, said internally facing side partially defining a sensor chamber, said sensor chamber being at least partially defined by a cap wafer disposed over the internally facing side of said base wafer, said base wafer further having a plurality of through vias penetrating said base wafer and extending between the internally and externally facing sides thereof;
    a first one of said through vias comprising a gas port that allows gas communication between said externally and internally facing sides of the base wafer, and specifically allowing a gas on the externally facing side of the base wafer to pass through said gas port through via into said sensor chamber;
    an electrochemical sensor responsive to a property of said gas, disposed in said sensor chamber;
    the electrochemical sensor comprising a first electrode and a second electrode, wherein the first and second electrodes are coupled by an electrolyte, and wherein the first electrode is exposed to said gas entering the sensor chamber through said gas port;
    a second one of said through vias comprising a conducting through via electrically coupling said first electrode of the electrochemical sensor to a first electrical contact on the externally facing side of said base wafer;
    a third one of said vias comprising a conducting through via electrically coupling said second electrode of the electrochemical sensor to a second electrical contact on the externally facing side of said base wafer;

at least one set of electrical connections that carry electrical signals to and from said device; and an integrated circuit constructed on or in any of the base wafer and cap wafer, said integrated circuit electrically coupled to said set of electrical connections, wherein any of said base wafer and said cap wafer comprise a printed circuit board (PCB).

2. The device of claim 1, further comprising a device package comprising the electrochemical sensor and said integrated circuit.

3. The device of claim 1, said sensor chamber being at least partially defined by a recess in the internally facing side of said wafer.

4. The device of claim 1, said cap wafer having a recess therein that partially defines said sensor chamber.

5. The device of claim 1, said cap wafer comprising any of: a wafer-level semiconducting panel, a die-level panel, a glass panel, a ceramic panel, a polymeric panel, and a printed circuit board (PCB) panel.

6. The device of claim 1, wherein the first and second electrodes are disposed between said electrolyte and said internally facing side of the base wafer.

7. The device of claim 1, further comprising a gas seal vertically disposed between said electrolyte and said internally facing side of the base wafer, which gas isolates a portion of said sensor chamber from another, the gas seal also laterally disposed around said first electrode and gas port.

8. The device of claim 1, further comprising a gas-permeable filter that filters gas passing through said gas port.

9. The device of claim 8, said filter being size-selective in its permeability.

10. The device of claim 8, said filter comprising at least one of a hydrophobic material and an oleophobic material.

11. The device of claim 8, said filter comprising sealed side walls.

12. The device of claim 1, said first and second electrical contacts comprising a solder bump that electrically couples the sensor device to external circuitry in a system including said sensor device.

13. The device of claim 1, any of said base wafer and said cap wafer comprising a silicon wafer.

14. The device of claim 1, any of said base wafer and said cap wafer comprising a ceramic wafer.

15. An article of manufacture, comprising:

a common base wafer and a common cap wafer, into which one or more integrated circuits are packaged, and onto which a plurality of electrochemical sensor devices are created;

each of said plurality of sensor devices comprising a plurality of electrodes disposed within respective sensor chambers at least partially defined by the base wafer and the cap wafer and sidewalls separating said cap wafer and base wafer;

each of said plurality of sensor devices further comprising an electrolyte material contacting each of said sensor device's respective plurality of sensor electrodes; and wherein:

at least one sensor electrode of each sensor device comprises a working electrode in gas communication with an external environment of said device by way of a respective gas port through via in one of said base and cap wafers so as to provide gas coupling between the working electrode and the external environment, while being gas-isolated from other electrodes within the same sensor device by a gas seal, and said sidewalls comprise a distinct separator wafer or plate separating the base and cap wafers by a thickness of said separator wafer or plate.

16. The article of claim 15, wherein at least one multi-sensor device is formed from said common wafers, the at least one multi-sensor device itself having a plurality of electrochemical sensor devices.

17. The article of claim 16, said multi-sensor device configured and arranged to detect a plurality of different gasses, each one of the electrochemical sensor devices of the multi-sensor device detecting one such different gas in the multi-sensor device.

* * * * *